United States Patent Office 3,408,099
Patented Oct. 29, 1968

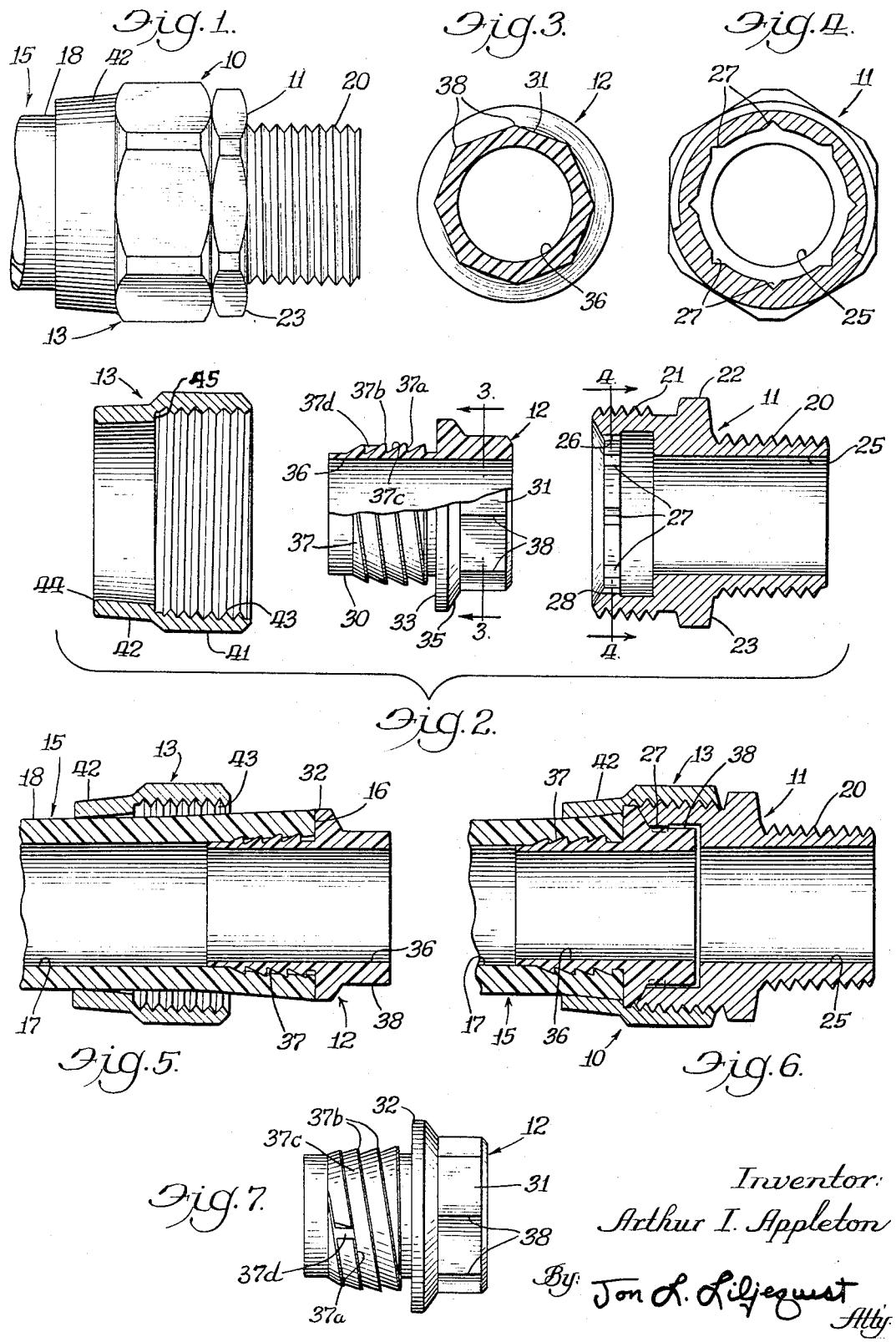

3,408,099
CONNECTOR FOR FLEXIBLE HOSING
Arthur I. Appleton, Northbrook, Ill. (% Appleton Electric Company, 1701 W. Wellington, Chicago, Ill. 60657)
Continuation-in-part of application Ser. No. 631,038, Apr. 14, 1967. This application Feb. 5, 1968, Ser. No. 703,089
2 Claims. (Cl. 285—247)

ABSTRACT OF THE DISCLOSURE

A reusable connector assembly for sealingly securing one end of a length of flexible hose to another fitting and including an easily installable internal element of preferably plastic-like material which includes structure facilitating a sealing engagement with the flexible hose and/or structure inhibiting twisting of the hosing during tightening of the connector assembly.

Cross reference to related application

This application is a continuation-in-part of my prior application, Ser. No. 631,038, filed Apr. 14, 1967 and now abandoned.

Background of the invention

This invention relates generally to connectors or flexible hosing and is directed to a relatively simple connector which is quickly and easily installable as well as being removable and reusable without injury either to the connector or to the hose connected thereto.

Most of the prior art hose connectors are designed to effect a fluid-tight coupling. In accomplishing this, some of these connectors require a minimum of four separate elements, some include at least one element which is deformed and which is therefore not reusable, and others are designed to bitingly engage the internal and/or external surface of the hose and prevent their removal except by cutting and destroying the end of the hose.

Many of the prior art patents also show a threaded element which is drawn up on the main connector body, and which, with other structure, serves to compressibly seal the connection. It has been found that when this threaded element or nut is in direct and compressing contact with the outer surface of the flexible hose, tightening of the nut may cause some rotation of the hose due to the frictional force developed therebetween. This action is of course undesirable because rotation of one end of the hose may cause the hose to twist and possibly flatten somewhere along its length, thus restricting fluid passage or preventing electrical wires from being threaded therethrough when, in the latter case, the hosing is used in an electrical installation.

Another problem arises when a very short length of hosing is being connected between fixed openings which are closely spaced. The stiffness which accompanies a short length of hose makes the short length rather difficult to align and connect.

As will be seen, the present invention substantially eliminates these disadvantages found in the prior art.

Summary of the invention

The invention, in its preferred embodiment, consists of a three-piece assembly which can be installed exceptionally easily to sealingly join flexible hosing to other apparatus. The invention features an internal element having portions at one end which are both easily insertable and easily removable from the end of a length of flexible hosing without causing damage thereto. The other end of this internal element carries means which cooperate with the mating end portions of a main connector body, this main connector body normally being first and fixedly connected to said other apparatus. This cooperation between the internal element and the connector body assists in preventing twisting of the hosing as well as simplifies the alignment and connection of the hosing to the main connector body. When the connector assembly is compressibly drawn and locked together by the third element of the assembly, various portions thereof co-act to ensure a sealed connection.

The assembly lends itself to being used in conjunction with mass-produced apparatus, e.g., it permits a large number of pre-cut lengths of hosing to be preassembled as sub-assemblies with portions of the subject connector attached thereto. The connector also lends itself to being used with relatively short lengths of hosing between relatively closely spaced openings by virtue of the fact that part of the connector is secured to the opening and another part secured to the hosing before being drawn together as an assembly. In drawing the parts together, use is made of the cooperating means on the internal element and main connector body to align and hold the hose in place, thus simplifying the work of the installer. In the event it is desired to disconnect or remove the coupling, the parts merely unscrew from one another. Because, in its preferred form, the hose inserted end of the internal element is threaded, it is removable from the hose without gouging or tearing. Thus, the same length of hose can be reused without cutting off the end.

For simplicity, the form of the third element is that of a modified nut. In tightening or untightening the nut, rotation of the hose as caused by friction between the hose and nut is prevented both by the cooperating means on the connector body and internal element as well as by the threads on the internal element. Therefore, the chance that the hose might flatten somewhere along its length due to relative rotation between its ends is prevented.

While the invention is shown in the drawing to assist in an understanding of one preferred form of the invention, this showing is not intended to limit the invention to the specific embodiment shown or to defeat that purpose of a patent which is to protectively cover the inventive concepts contained therein. The appended claims are the chief aid towards this purpose as it is those that point out the scope of the invention.

Description of the drawings

FIG. 1 is a side view of a connector assembly incorporating the principles of one preferred form of the invention, this view also including a short segment of flexible hose connected thereto;

FIG. 2 is a cross-sectional and partially fragmentary view of each of the major components of the connector assembly shown in FIG. 1, these components being spread out axially in the drawing to assist in an understanding of the interrelationship of the parts;

FIG. 3 is a cross-sectional view of the internal element taken substantially along the lines 3—3 of FIG. 2;

FIG. 4 is a cross-sectional view of the connector body taken substantially along the lines 4—4 of FIG. 2;

FIG. 5 is a cross-sectional view of a portion of the connector assembly including the end portions of a length of flexible hose, this view showing a partially assembled connection;

FIG. 6 is a cross-sectional view of an assembled connector assembly connected into the end portion of a length of flexible hose; and FIG. 7 is a side view of the tubular insert rotated 90 degrees from the position of FIG. 2.

Description of the preferred embodiment

Referring now to the drawings, the connector assembly as a whole is shown generally at 10 and includes a main connector body 11, a tubular internal member or element 12, and combined compression and securing means in the form of modified nut 13. Together, these three elements comprise a connector for sealingly connecting a length of flexible hose 15 to some other apparatus (not shown). Hose 15 includes a connector end 16, an inner surface 17, and an outer surface 18. Connector assembly 10 is designed primarily for use with a hose made principally of nonmetallic material such as neoprene and/or various modern plastics although other comparable products may work equally as well.

Main connector body 11 is of modified cylindrical shape having an externally threaded outer end portion 20 separated from fastening means in the form of an externally threaded inner end portion 21 by means of a generally centrally located flange 22. The outer periphery of flange 22 is hexagonally or nut-shaped to facilitate the grasping and/or turning of the connector body with a wrench, this flange forming an outwardly facing shoulder 23. Thus, connector body 11 may be screwed into the internally threaded hole of some other apparatus such as, for example, a housing (not shown). If desired, a washer-shaped sealing gasket (not shown) can be first slipped over threaded end portion 20 so as to become compressed in fluid-tight compression between shoulder 23 and the housing. Of course, if the hole in the housing does not contain threads, portion 20 can be inserted therethrough and a nut can be drawn up on the threaded portion 20 from the other side of the housing. It will be understood, however, that the specific shape and form of end portion 20 do not form a part of the present invention, this description being presented for the purpose of completeness only.

Extending entirely through connector body 11, and axially thereof, is a passage 25. Near the inner end of the connector body passage 25 is in part defined by an inwardly formed lip 26 having a plurality of eight regularly spaced notches 27 cut therein and forming locking means. These notches function in a manner broadly similar to a keyway and are used in conjunction with internal tubular member 12 in a manner to be brought out later. The innermost end of the connector body is beveled as at 28 to provide a seat for a seal which forms part of the tubular member, to be described next.

Tubular member 12 includes a hose end portion 30 and a connector body end portion 31 separated by a larger diameter flange 32. Flange 32 defines a flat shoulder 33 facing hose end portion 30 and a beveled shoulder 35 facing connector body end portion 31. Shoulder 33 serves to limit the depth to which hose end portions 30 can be inserted into the hose, and beveled shoulder 35 is dimensioned to flushly engage bevel 28 on the main connector body when the device is fully assembled to thereby provide a sealed connection therebetween.

Extending entirely through tubular member 12 between end portions 30 and 31 is an axial hole 36. Hole 36 is only slightly smaller than the internal diameter of hosing 15 so as not to unduly interfere with the passage therethrough of whatever materials the hose carries. Thus the outermost end of hose end portion 30 has a very thin wall and thereby possesses some resiliency.

Hose end portion 30 is also formed with external groove means thereon in the form of a buttress thread 37. Thread 37 is preferably right-handed for reasons to be brought out later. The outside diameter of thread 37 is slightly larger than the inner diameter of hose 15 so as to form an interferring fit therebetween when end portions 30 are inserted into the hose.

Buttress thread 37 includes a tapered surface 37a, an outermost flat-surfaced crest 37b, and what appears as a generally vertical surface 37c in the figures. This form of thread has been found to not only best resist the removal of the hose from the connector as caused by an axial load thereon, but also is particularly non-destructive to the internal end of the hose when deliberately rotated to assist in its removal therefrom.

On each of two diametrically opposing sides of the outermost end of thread 37 is a narrow rib 37d connecting the axially separated crests 37b. This rib in no way hampers insertion of hose end portion 30 into the end of the hose nor does it significantly hamper removal therefrom by unscrewing it. However, as will be described in greater detail later, it is extremely effective in preventing removal of the hose from the connector after an installation has been made.

Connector body end portion 31 has an external periphery which is octagonally shaped in cross-section (best seen in FIG. 3). This octagonal shape forms eight corners 38 dimensioned to matingly fit within the eight notches 27 in the main connector body. Thus, the eight corners 38 form interlocking means which interlock with the notches 27 in a keying manner when portions 31 of the tubular member are inserted into the inner end portions of the passage 25.

Tubular member 12 is preferably molded of a plastic material such as polypropylene which is sufficiently rigid to maintain its shape under the loading to which it is subjected, yet of sufficient softness and resilience to maintain good sealing contact and present permanent deformation. In an electrical installation, where the hosing carries electrical wires rather than fluids, plastic materials are desirable because of their dielectric properties.

Means are provided for securing or tightening the assembly together, and herein these means comprise modified nut 13. Nut 13 consists of a nut-shaped portion 41 and a tapered flange portion 42. Portion 41 carries internal threads 43 therein sized to engage the externally threaded inner end portion 21 of the main connector body, and the outer peripheral shape (best seen in FIG. 1) is hexagonally or nut-shaped to facilitate its being grasped and turned with a wrench. Tapered flange portion 42 has an inner diameter which tapers axially from a maximum adjacent portion 41 to a minimum at its outermost end 44. The inner diameter of outermost end 44 is substantially the same as the outer diameter of hose 15.

The maximum inner diameter of portion 42 is somewhat less than the minimum diameter of threads 43 so as to form a shoulder 45 therebetween. Shoulder 45 serves both to drive flange 32 into sealing contact with lip 26 as well as to retain internal element 12 within the assembly during packaging and shipment.

In assembling the connector, and assuming each of the three elements are separated from one another, threaded outer end portion 20 of the connector body 11 is screwed into an appropriately sized and internally threaded hole in the apparatus to which the hosing is to be connected. If a high pressure resistant seal is desired, either the threads can be loaded with a sealing compound or a washer-shaped gasket can be placed over the threads before attachment.

Hose 15 is then pre-assembled by first slipping modified nut 13 over the end of the hose and back thereover so as to be out of the way. Then end portions 30 of the internal element 12 are pushed into the end of the hose. If the assembler encounters difficulty in pushing portions 30 entirely into the hose until the hose end 16 abuts shoulder 33 on the internal element, this difficulty being caused by the interfering fit between threads 37 and the inner surface 17 of the hose, he can grasp end portions 31 of the internal bushing by hand or with a suitable implement and screw it into the hose the remainder of the way. This hose-end sub-assembly can be viewed in cross-section in FIG. 5. It will be noted that the end portions of the hose 15 are slightly expanded or flared outwardly, due to the sizing of buttress thread 37, so as to increase its diameter and prevent modified nut 13 from slipping off. It will also be noted that the buttress thread 37 on the internal member bites into the inner surface 17 of the hose to prevent its being pulled out. At this point the various elements of the connector are fully pre-assembled and ready to be locked together.

In forming the fully assembled and sealed connection, the assembler merely inserts end portion 31 of the internal member into the inner end of passage 25 in the connector body. Because of the sizing of portion 31 and passage 25, portions 31 will only slip into the inner end of passage 25 when the eight corners 38 on the internal element are aligned with the eight notches 27 on the connector body. Since the corners and notches are regularly spaced, alignment is achieved with very little if any rotation of the end of the hose. With portion 31 of the internal element fully inserted, such that beveled shoulder 35 of the internal element engages the beveled innermost end 28 of the connector body, the internal element and connector body are held in axial alignment.

Therefore, the assembler need only slide modified nut 13 over the hose toward the connector body until internal threads 43 therein engage the external threads on portion 21 of the connector body. At this point, the outermost end 44 of nut 13 has not yet reached the flared end of hose 15. By screwing the nut 13 up on threaded portion 21, the trailing tapered flange portion 42 compresses the flared end of hose 15 into threads 37. At the same time, beveled shoulder 35 and beveled end 28 are compressed into a sealing annular contact. The tightening of nut 13 also tends to drive hose end 16 into compression against shoulder 33 of the internal element.

With the deformable hose material compressed into thread 37 around rib 37d, it is virtually impossible to turn or rotate the hose relative to the connector. Thus, the seal created by drawing up nut 13 is fixed, and it cannot be later destroyed inasmuch as relative angular movement is effectively prevented. However, when it is desired to remove element 12 from the end of the hose, release of the bulk of the compression by unscrewing nut 13 permits the element 12 to be screwed out of the hose by virtue of thread 37 without any noticeable interference from rib 37d.

Preferably, the parts are designed so that a proper seal is effected when nut 13 is drawn up to the point where its leading surface engages flange 22. Thus, no judgement is required on the part of the assembler as to how tightly nut 13 should be drawn up. Instead, he merely tightens nut 13 until it abuts flange 32 of the connector body. Thus, all connections made with this connector are uniform.

Also, internal element 12 is preferably designed such that the outermost end of portions 30 extend outwardly beyond end 44 of nut 13 when the connector is fully assembled (best seen in FIG. 6). This is particularly desirable in installations where one end of the hose moves relative to the other such as in certain types of hydraulic machinery. These thin walled endmost portions of the internal element, being resilient in nature, help to prevent failure of the hose at the connector by providing some additional and flexible support to the hose at its most vulnerable place which is adjacent the connector.

It will be understood that removal of the connector is also simple and results in no permanently injured parts, either to the connector elements, or to the hosing. With many other known connectors, particularly after some duration of use, injury results to the hosing or connector upon its removal. This is particularly true when the connector includes a hose inserted element which must be pulled out. However, internal element 12 of the present invention is easily removed from the end of hose 15 by unscrewing it, either by hand or with the help of a wrench.

It will be appreciated that the connector assembly described herein has wide application and may be used in other forms appearing quite different. For example, in some applications it may be desirable to construct the internal bushing of several pieces rather than one. Other applications might combine several elements and still achieve the results herein described.

I claim:
1. For use with a length of flexible hose, a multiple piece connector for sealingly attaching one internally unthreaded end of said hose to other apparatus, comprising: a straight tubular insert element having a hose end portion and an opposite end portion separated by a sealing flange therebetween, said hose end portion having a helical thread formed integrally therewith and having a maximum diameter slightly in excess of the internal diameter of said hose to cause a slight radial expansion of said hose end when said thread is inserted therein, said thread having longitudinally extending means, said sealing flange including a shoulder facing said hose end portion for limiting the depth to which said hose end portion can be inserted into said hose, said flange also including a sealing surface generally facing said opposite end portion, said opposite end portion having a polygonal outer periphery in cross section; a hollow connector body having an outer end and an externally threaded inner end defining a passageway therethrough, said outer end being threaded for connection with said other apparatus and said passage at the inner end being defined to thereby internally receive the opposite end of the tubular insert element only in axial alignment therewith in any one of a plurality of angular orientations, said inner end having means cooperating with said polygonal outer periphery to prevent relative rotation between the tubular insert element and the connector body; and a special nut designed to screwedly engage the externally threaded inner end of the connector body and compress said sealing surface into the connector body's inner end, said nut also including a trailing portion having an internally tapered surface for engaging the expanded end of the hose as the nut is drawn up on the connector body to thereby compress the hose material into the tubular element's thread to resist axial separation and also to compress the hose material around said longitudinally extending means to prevent relative rotation between said hose and tubular element.

2. A multiple piece connector as set forth in claim 1 wherein said longitudinally extending means comprises a rib.

References Cited

UNITED STATES PATENTS

| | | | |
|---|---|---|---|
| 884,461 | 4/1908 | Browne | 285—259 X |
| 2,152,975 | 4/1939 | Sanford | 285—249 |
| 2,230,115 | 1/1941 | Kreidel | 285—248 |
| 2,371,971 | 3/1945 | Main et al. | 285—259 |

FOREIGN PATENTS

| | | |
|---|---|---|
| 719,279 | 11/1931 | France. |
| 801,859 | 9/1958 | Great Britain. |
| 869,241 | 5/1961 | Great Britain. |

CARL W. TOMLIN, *Primary Examiner.*

T. F. CALLAGHAN, *Assistant Examiner.*